(12) United States Patent
Gates et al.

(10) Patent No.: US 9,617,928 B2
(45) Date of Patent: Apr. 11, 2017

(54) AUTOMOTIVE COMBINATION SENSOR

(71) Applicant: Ford Global Technologies, LLC, Dearborn, MI (US)

(72) Inventors: Freeman Carter Gates, Bloomfield Hills, MI (US); Dennis Vroman, Saint Clair Shores, MI (US); Fadi Maroun Naddaf, Macomb Township, MI (US); Gitanjli McRoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 849 days.

(21) Appl. No.: 13/869,786

(22) Filed: Apr. 24, 2013

(65) Prior Publication Data
US 2014/0324323 A1 Oct. 30, 2014

(51) Int. Cl.
*F02D 21/08* (2006.01)
*F02D 41/00* (2006.01)

(52) U.S. Cl.
CPC ......... *F02D 21/08* (2013.01); *F02D 41/0072* (2013.01); *F02D 41/0052* (2013.01); *F02D 2021/083* (2013.01); *F02D 2200/0406* (2013.01); *Y02T 10/47* (2013.01)

(58) Field of Classification Search
CPC ........... F02M 25/0754; F02M 25/0777; F02M 25/0727; F02M 25/074; F02M 25/0756; F02M 25/0781; F02M 2025/0762; F02M 25/0709; F02M 25/0718; F02M 25/0795; Y02T 10/47; F02D 41/0072
USPC ........................................ 123/568.11–568.32
See application file for complete search history.

(56) References Cited

U.S. PATENT DOCUMENTS

| | | | |
|---|---|---|---|
| 4,022,237 A | 5/1977 | Wertheimer | |
| 4,164,206 A | 8/1979 | Toelle | |
| 4,825,841 A | 5/1989 | Norota et al. | |
| 5,029,569 A | 7/1991 | Cullen et al. | |
| 5,136,517 A | 8/1992 | Cullen et al. | |
| 5,851,456 A * | 12/1998 | Mukawa | B29C 43/18 264/275 |
| 6,125,830 A | 10/2000 | Kotwicki et al. | |
| 6,182,644 B1 | 2/2001 | Kotwicki et al. | |
| 6,308,694 B1 | 10/2001 | Kotwicki et al. | |
| 6,321,536 B1 | 11/2001 | Henderson et al. | |
| 6,321,732 B1 | 11/2001 | Kotwicki et al. | |
| 6,347,519 B1 | 2/2002 | Kreso | |
| 6,363,922 B1 | 4/2002 | Romzek et al. | |
| 6,390,055 B1 | 5/2002 | Sivashankar et al. | |
| 6,434,474 B1 | 8/2002 | Kotwicki et al. | |
| 6,459,985 B1 | 10/2002 | Kotwicki et al. | |
| 6,588,210 B2 | 7/2003 | Kreso | |
| 6,609,058 B1 | 8/2003 | Russell et al. | |
| 6,612,179 B1 * | 9/2003 | Kurtz | G01L 9/0052 73/727 |
| 6,658,847 B2 | 12/2003 | Shirakawa | |
| 6,659,095 B2 | 12/2003 | Kotwicki et al. | |

(Continued)

*Primary Examiner* — Sizo Vilakazi
(74) *Attorney, Agent, or Firm* — Julia Voutyras; McCoy Russell LLP

(57) ABSTRACT

Systems are provided for EGR mass and air mass estimation during steady state and transient operations. By utilizing a combination sensor comprising of a manifold absolute pressure sensing element and a differential pressure sensing element sharing a common pressure chamber with connections to the intake manifold, errors in EGR mass estimation may be reduced.

13 Claims, 6 Drawing Sheets

(56) References Cited

U.S. PATENT DOCUMENTS

| | | |
|---|---|---|
| 6,687,600 B2 | 2/2004 | Russell et al. |
| 6,711,489 B2 | 3/2004 | Haskara et al. |
| 6,802,302 B1 | 10/2004 | Li et al. |
| 6,837,227 B2 | 1/2005 | Jaliwala et al. |
| 6,848,434 B2 | 2/2005 | Li et al. |
| 6,850,833 B1 | 2/2005 | Wang et al. |
| 6,880,524 B2 | 4/2005 | Gates et al. |
| 6,944,530 B2 | 9/2005 | Russell et al. |
| 6,968,833 B2 | 11/2005 | Yu et al. |
| 7,103,460 B1 | 9/2006 | Breed |
| 7,182,075 B2 | 2/2007 | Shahed et al. |
| 7,281,531 B1 | 10/2007 | Fulton et al. |
| 7,305,967 B1 | 12/2007 | Hagari et al. |
| 7,421,321 B2 | 9/2008 | Breed et al. |
| 7,516,009 B1 | 4/2009 | Han |
| 7,725,199 B2 | 5/2010 | Brackney |
| 7,743,757 B2 | 6/2010 | Gates et al. |
| 7,814,893 B2 | 10/2010 | Jefford et al. |
| 7,963,275 B2 | 6/2011 | Stein et al. |
| 7,963,277 B2 | 6/2011 | Gates et al. |
| 8,042,528 B2 | 10/2011 | Gates et al. |
| 8,176,903 B2 | 5/2012 | Stein et al. |
| 8,201,442 B2 | 6/2012 | Osburn et al. |
| 2008/0257052 A1* | 10/2008 | Kuznia .................. G01L 15/00 73/700 |

* cited by examiner

AUTOMOTIVE COMBINATION SENSOR

FIELD

The present disclosure relates to estimation of exhaust gas recirculation and air charge during steady state and transient operation conditions.

BACKGROUND AND SUMMARY

Engine control systems employ exhaust gas recirculation (EGR) mechanisms to regulate exhaust emissions and improve fuel economy. External EGR is also used by automotive manufacturers to improve fuel economy. EGR improves fuel economy by reducing pumping losses at part throttle (that is, EGR can lower engine pumping work by increasing intake manifold pressure). Further, by adding cooled EGR, the tendency for spontaneous ignition initiated via spark-ignited combustion, may be reduced.

EGR involves recirculating exhaust gas from the exhaust manifold into the intake manifold through a flow control valve placed in the path of the EGR flow in between the exhaust manifold and the intake manifold. In doing so, exhaust gases are added to the air-fuel mixture. EGR amount may be calculated by a controller based on manifold absolute pressure (MAP) of the intake manifold and a differential pressure measured across a fixed orifice located downstream of the flow control valve. Based on the EGR amount, a cylinder air charge is estimated and accordingly, fuel injection may be adjusted to control air/fuel ratio.

One example method for EGR flow and air flow estimation is shown by Russell et al. in U.S. Pat. No. 6,944,530. Therein, the manifold pressure sensor is used to measure the pressure downstream of the orifice and a single absolute pressure sensor is used to measure the pressure upstream of the orifice. Based on the calculated differential pressure across the orifice, EGR flow is estimated and subsequently cylinder air charge may be estimated.

However, the inventors herein have identified potential disadvantages with such approaches. As one example, the above approach utilizes two different sensors to measure MAP and differential pressure across the orifice. Such operation may result in the MAP sensor either being positioned away from a desired measurement location in the intake manifold (resulting in potentially inaccurate MAP readings), or a measurement tube enabling the MAP sensor to be positioned at a remote location (resulting in lagging MAP readings). In one example, inaccuracies in EGR estimation may occur due to a lag between MAP and EGR differential pressure signals. Transient errors in EGR mass estimation can cause errors in estimated air mass which may consequently result in errors in fuel delivery and air-fuel ratio control, precisely when accurate EGR determination is most needed (due to the delay in air-fuel ratio sensor feedback identifying such transient fueling errors).

In one example, the above issues may be addressed, at least in part, by a system comprising: an intake manifold, an EGR passage coupled to the manifold with an EGR valve, a sensor housing coupled directly to the manifold, with absolute and differential pressure sensing elements sharing a connection to the manifold. In some examples, an orifice may be positioned downstream of the EGR valve. In this way, by packaging the differential pressure sensor and manifold absolute pressure sensor in a single unit that utilizes a common pressure chamber within which the intake manifold pressure may be measured, any changes in the MAP will result in a simultaneous change in differential pressure eliminating the lag between MAP and differential pressure signals. Further, by inserting the combination sensor directly into the intake manifold, the stand alone differential pressure sensor may be eliminated along with an additional electrical connector and sensor mounting mechanisms resulting in cost saving.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings.

DETAILED DESCRIPTION

Methods and systems are provided for reducing air mass estimation error in engine systems (such as engine system of FIG. 1) that utilize speed density air estimation and exhaust gas recirculation strategies during transient and steady state conditions. A combination sensor module, described at FIGS. 2 and 3, may be employed in the engine system of FIG. 1, as described at FIGS. 4A-4B, to reduce errors in exhaust gas recirculation mass determination. Further, a feedback regulation mechanism, as illustrated in a block diagram at FIG. 5, may be utilized to control exhaust gas recirculation flow. A controller, such as the controller of FIG. 1, may be configured to perform a control routine, such as the example routine of FIG. 6 to estimate air mass based on exhaust gas recirculation mass using the combinational sensor of FIGS. 2-4, and the mechanism of FIG. 5.

Figure 1:
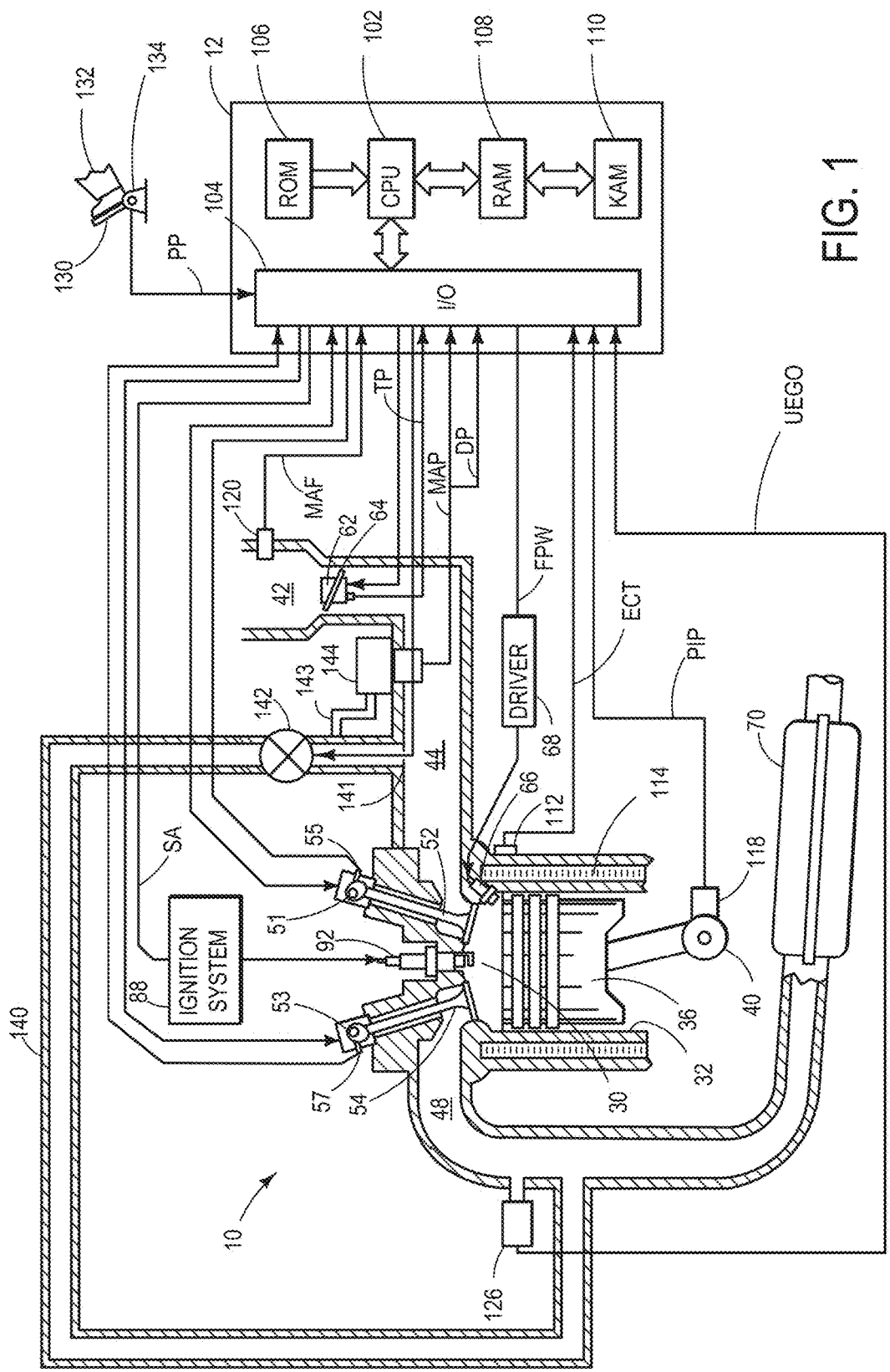
FIG. 1 shows a schematic diagram of a combustion chamber of an internal combustion engine.

FIG. 1 is a schematic diagram showing one cylinder of multi-cylinder engine 10, which may be included in a propulsion system of a vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 for providing mass air flow MAF signal to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake manifold 44 via EGR passage 140. In a turbocharged engine, the EGR system may be a high-pressure system (from upstream of the turbine to downstream of the compressor) or a low-pressure EGR system (from downstream of the turbine to upstream of the compressor). The amount of EGR provided to intake manifold 44 may be varied by controller 12 via EGR valve 142. Further, a combination sensor 144 may be arranged at the intake manifold and may communicate with the EGR passage. The combination sensor 144 may provide an indication of one or more of pressure, temperature, and concentration of the exhaust gas. Additional details of an example combination sensor are described with regard to FIGS. 2-4. In some examples, sensor 144 may comprise a manifold absolute pressure (MAP) sensing element and a differential pressure (DP) sensing element, as well as a manifold temperature sensing element. The MAP sensing element may sense a manifold absolute pressure and provide a MAP signal to the controller 12. The DP sensing element may detect a pressure drop across an EGR flow control orifice 141 placed downstream of the EGR valve, which when combined with MAP, can provide an indication of the amount of EGR. The DP sensing element may provide a differential pressure signal DP across the EGR orifice to the controller 12. In some examples, the flow control orifice 141 may be placed upstream of the EGR flow control valve 142, or downstream of the valve 142 as shown. Sensor 144 may be coupled to the EGR passage upstream of the EGR flow control orifice through upstream connector 143. Sensor 144 may sense a pressure upstream of the flow control orifice 141 through the upstream connector 143. In some examples, an additional sensor may sense EGR valve position to indicate EGR valve flow area changes based upon commands from controller 12 and thus provide feedback control for valve position control.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120, engine coolant temperature (ECT) from temperature sensor 112 coupled to cooling sleeve 114, a profile ignition pickup signal (PIP) from Hall effect sensor 118 (or other type) coupled to crankshaft 40, throttle position (TP) from a throttle position sensor, absolute manifold pressure signal (MAP), and differential pressure (DP) signal from combination sensor 144. Engine speed signal, RPM, may be generated by controller 12 from signal PIP. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102.

As described above, FIG. 1 shows only one cylinder of a multi-cylinder engine, and that each cylinder may similarly include its own set of intake/exhaust valves, fuel injector, spark plug, etc.

Figure 2:
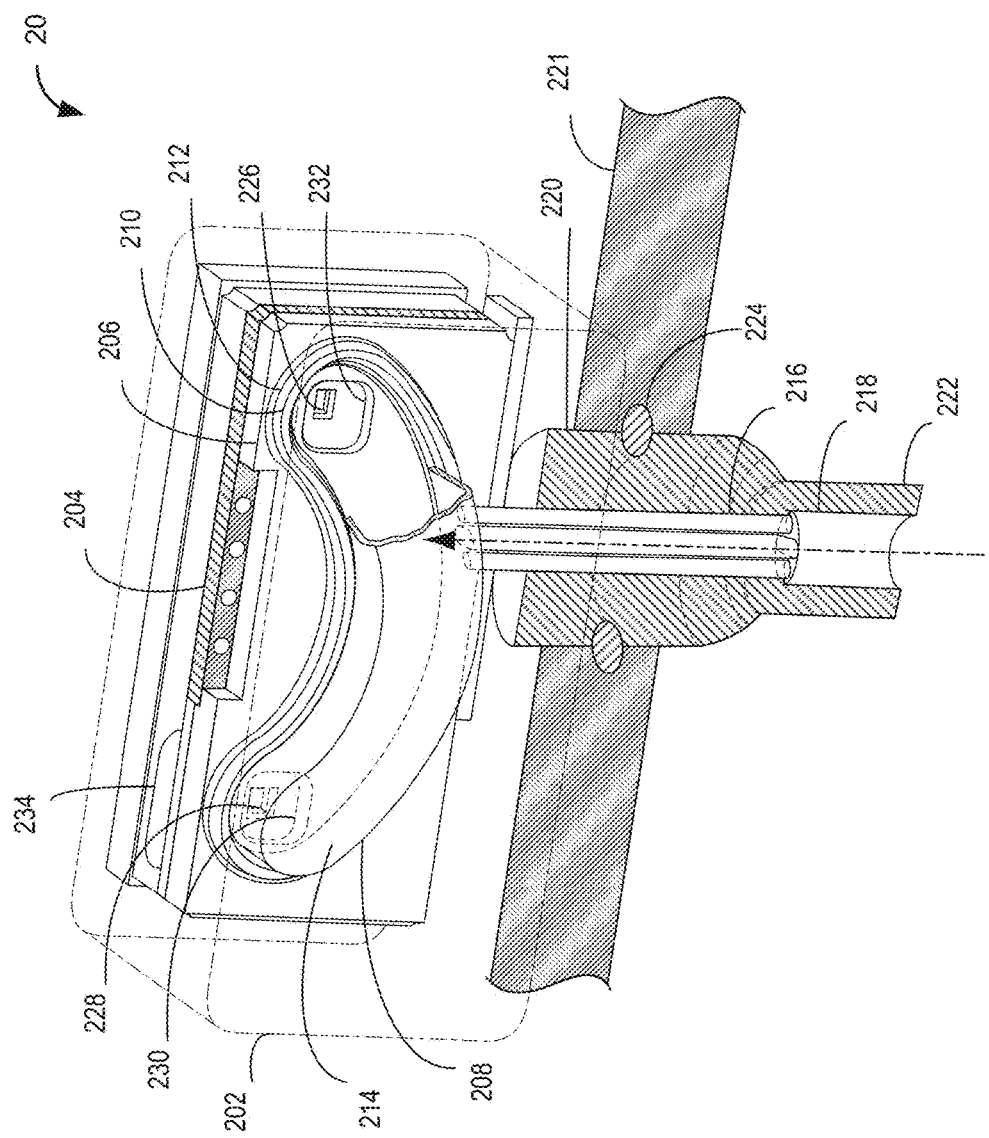
FIG. 2 shows a schematic diagram of a side view of a combination sensor.
Figure 3:
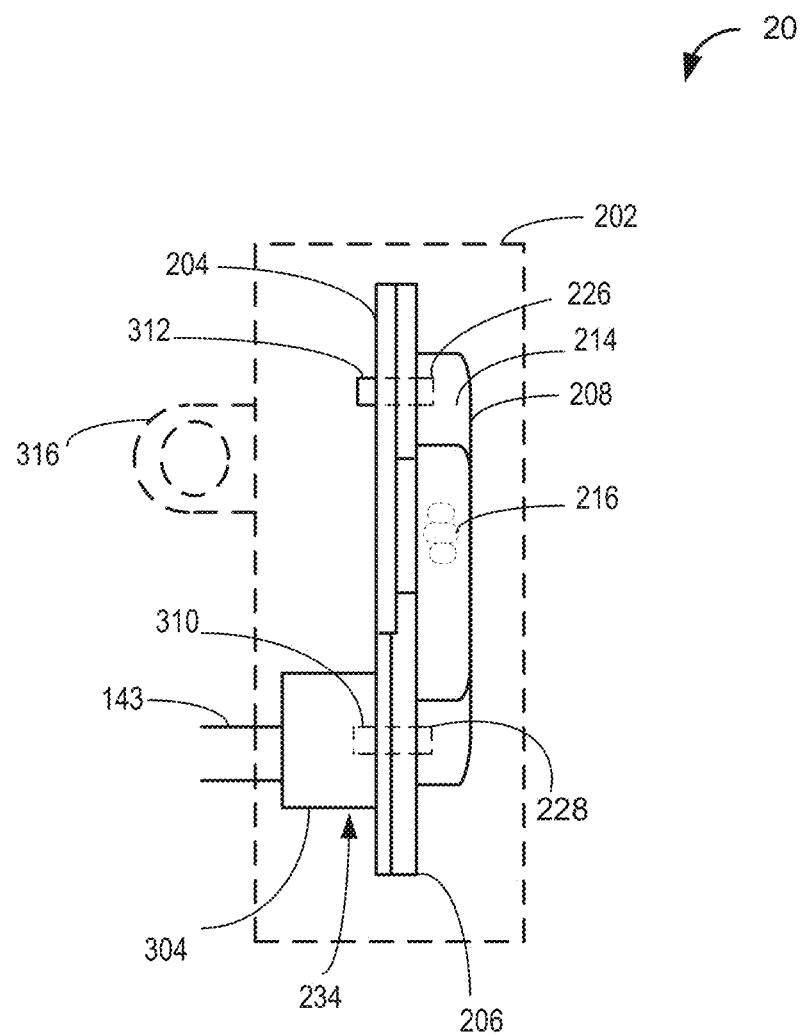
FIG. 3 shows a schematic diagram of a top view of a combination sensor.

In this way, the engine system of FIG. 1 enables the detection of MAP signal and DP signal by a single combination sensor, described in further detail at FIGS. 2 and 3.

FIGS. 2 and 3, describe an example combination sensor module 20 of combination sensor 144 that may be used to determine an exhaust gas recirculation (EGR) amount, such as EGR mass flow rate, based on a measured manifold absolute pressure of the intake manifold and a measured differential pressure across an exhaust gas recirculation (EGR) orifice. EGR mass may be subsequently employed to determine an air mass for air-fuel ratio control as described herein. The combination sensor described herein may be used to determine more accurate EGR mass which may result in improved air mass estimation and consequently, improved fuel delivery.

Now turning to FIG. 2, it shows a side view of the combination sensor module 20 that is inserted into, and mounted to, a wall 221 of intake manifold 44 downstream of a throttle (not shown). Module 20 may comprise an outer housing 202. The module may further comprise a panel 204 that may contain at least a printed circuit board, one or more power supplies, and multiple electrical connections (not shown). An inner manifold housing 208 may be mounted on to a backside panel 206 coupled to the panel 204. A gasket 210 may be used to mount the inner manifold housing 208 to a groove 212 located in the backside panel 206. Inner manifold housing 208 may be designed such that a pressure chamber 214 is formed. In one example, inner manifold housing 208 may be curved towards the intake manifold, one side of the curve having a concave surface, and an opposite side of the curve having a corresponding convex surface in order to form a relatively uniform cross-sectional area along the curve. The convex surface may be located closer to the intake manifold than the concave surface and may comprise one or more connections 216 coupling the pressure chamber 214 to the intake manifold. The one or more connections may provide parallel connections, with an inner connection having an oblong cross-section, and two outer connections having a smaller cross-sectional area that is circular.

Inner manifold housing 208 may comprise two ends, each end bearing a curved shape and the curved shape comprising a convex surface. The two curved ends of the inner manifold housing 208 may be turned towards a side of the module opposite to a side closest to the intake manifold (that is, towards a top side of the module). Further, the two ends of the inner manifold housing may be located at the same level with respect to the intake manifold and may be separated from each other by a distance, the distance depending on a length of the inner manifold housing 208. Alternatively, the inner housing may be a horizontal cylinder or may be designed to be U-shaped or another shape that would allow uniform pressure to be present throughout the chamber.

As noted above, pressure chamber 214 may be directly or indirectly coupled to the input manifold through one or more connectors 216. In one example, the connectors may be three in number, each connector coupling the pressure chamber to the intake manifold in parallel. The one or more connections may be positioned offset from a center of the manifold between the ends of the inner manifold housing, closer to the MAP sensing element 226 than the DP sensing element 228. Two of three connectors may have equal area of cross section, and the third connector may have an area of cross section different from the other two connectors. The third connector may be arranged such that it is flanked on either side by the two connectors having the same cross-sectional area. Further, all three connectors may be un-equal in height. In another example, there may be a single connector coupling the pressure chamber to the intake manifold.

One end of the connectors 216 may directly open into the pressure chamber 214. In the example shown herein, opposite ends of the connectors 216 may open into a manifold connector 218 coupled directly to the input manifold. In another example, the opposite ends of the connectors 216 may open directly into the input manifold. Connectors 216 may be partly located within a connector housing 220. Likewise, manifold connector 218 may be partly located within a manifold housing 222. Each connector may be of uniform width from one end to another to allow unrestricted movement of gases between the pressure chamber and the intake manifold. Seal 224 may be used to couple the connector housing 220 and the manifold housing 222.

Manifold absolute pressure (MAP) sensing element 226 and differential pressure (DP) sensing element 228, mounted on the board 204, may communicate directly with the pressure chamber 214 through holes in board 206. For example, manifold absolute pressure sensing element 226 may communicate directly with differential pressure sensing element 228 through pressure chamber 214. Each sensing element may be located at or near each end of the curved housing 208. Further, it may be ensured that the sensing elements are located at the same level with respect to the input manifold. The manifold pressure and the differential pressure sensing elements may be mounted onto platforms 232 and 230 respectively, within the pressure chamber. The absolute and differential pressure sensing elements may be electrically connected to the panel 204. By locating the absolute and the differential pressure sensing elements in the same pressure chamber, any lag in the pressures sensed by the different elements may be reduced. By reducing the lag in the pressures determined by the sensing elements, more accurate EGR mass may be estimated.

In one example, MAP sensing element 226 may be configured to detect a manifold absolute pressure. In another example, the MAP sensing element may also be a temperature-manifold absolute pressure (T-MAP) sensor and may detect a temperature of the input manifold in addition to the manifold absolute pressure. Manifold pressure signal from a manifold pressure sensing element may be used to provide an indication of vacuum in the intake manifold. During stoichiometric operation, the MAP sensor can give an indication of engine torque. Further, this sensor, along with the detected engine speed, can provide an estimate of charge (including air) inducted into the cylinder.

DP sensing element may comprise an upstream DP port 234 comprising an upstream DP sensing element (see also FIG. 3), and a downstream DP port comprising a downstream DP sensing element 228. Upstream DP port 234 may be located at an opposite side of downstream DP port. Upstream DP port 234 may be configured to sense an upstream DP pressure signal from a location upstream of the fixed EGR orifice. Similarly, downstream DP port may be configured to detect a pressure signal from a location downstream of the fixed EGR orifice, in common with the MAP sensing element via inner manifold housing 208. Thus, the differential pressure element may generate an upstream pressure signal and a downstream pressure signal and a differential pressure across the EGR orifice may be determined based on a pressure difference between the upstream and downstream pressure signals.

MAP sensing element 226 may be located in close proximity to downstream DP sensing element such that MAP signal is in close proximity to downstream DP signal. As a result, manifold pressure is exposed to the MAP sensing element and the downstream DP sensing element substantially simultaneously (such that any delay errors between the two are less than a resolution of the sensing elements) through common pressure chamber 214. Therefore, both MAP signal and downstream DP signal may be detected within the pressure chamber 214. By locating the MAP signal in close proximity to downstream DP signal within the same pressure chamber, manifold volume contributions, particularly during transient engine operating conditions, may be reduced. Consequently, errors in EGR mass estimation may be reduced.

Sensor module 20 shown in this example is rectangular. In other examples, the sensor module may be square, circular or another shape that allows the sensing elements to be located in close proximity in a common pressure chamber.

In this way, by locating the MAP sensing element and the downstream DP sensing element in a common pressure chamber for measuring the input manifold pressure, any lag between the MAP signal and the DP signal may be reduced. As a result, more accurate EGR mass may be estimated. Consequently, more accurate air mass may be estimated providing improved air/fuel control and fuel delivery.

Turning to FIG. 3, a schematic diagram of a top view of a combination sensor is illustrated. As described at FIG. 2, combination sensor module 20 may be inserted into the input manifold through connector housing comprising of connectors 216 and connected to manifold housing. Also, a mounting bracket 316 rigidly coupled to the housing 220 is shown having a hold for receiving an attachment element. The attachment element may connect to the intake manifold to secure the sensor to the intake manifold. Further, as described at FIG. 2, the described components of the combination sensor may be enclosed within an outer housing 202. Pressure chamber 214 enclosed within inner manifold housing 208 (described at FIG. 2) may be located on backside panel 206 of panel 204. Panel 204 may be a printed circuit board and may comprise an upstream DP port 234, a housing 304, an upstream connector 143, one or more power supply units (not shown), an upstream sensing element 310 of the DP sensing element, and one or more processing elements (not shown). Further, the panel 204 may comprise a part 312 of the MAP sensing element 226.

Upstream DP port 234 may be located on a side opposite to the downstream DP sensing element 228. The upstream DP port may be shielded from pressure signals coming from the pressure chamber 214. Upstream DP sensing element 310 may be located within the upstream DP port, which may be coupled to an area upstream of a fixed EGR orifice and downstream of an EGR valve through upstream connector 143. The upstream DP port may be enclosed in a housing 304 such that the upstream DP port senses only a signal from upstream of the orifice (e.g., the upstream DP port may sense an upstream pressure signal). While the upstream connector 143 tube volume may be greater than the volume of the connections between the MAP and DP sensors to the intake manifold, due to the nature of the EGR flow estimation routines, described below, the effect of this delay is insignificant such that the tube volume contribution may be neglected during EGR mass determination. Note that this is only true because delays between the upstream pressure sensing of the MAP and DP sensors is aligned to have a common delay. In one example, the upstream connector tube volume may be approximately 0.002 L.

Processing element (not shown) may process signals from the MAP sensing element and the DP sensing element. In one example, processing element may communicate with a Proportional-Integral-Derivative (PID) controller. Alternatively, processing element may communicate with another feedback or feedforward controller in controller 12. The PID controller may be used to control the EGR valve located upstream of the EGR orifice based on an error calculated between a desired EGR flow and an actual EGR flow as described herein.

One or more power supply units to power the absolute and differential pressure sensing elements may be provided within the panel. The panel may also comprise internal electrical connections that link the MAP and DP sensing elements to the power supply and the processing elements.

In one example as described, the sensor module may comprise an inner manifold housing within which multiple sensors may be located. Each sensor may be located on a substrate within the housing such that on one side, the sensors communicate with each other through a common pressure chamber defined by the inner manifold housing. On a side opposite to side communicating with the common pressure chamber, one of the sensors may communicate (through a housing) with a location in the path of EGR flow. Another sensor such as an absolute pressure sensor, may communicate with a reference chamber on the opposite side within the module.

The inner manifold housing may open into a connection to the input manifold. As a result, the pressure chamber may be in fluid communication with the intake manifold. The communication between the pressure chamber and the intake manifold at the inner manifold housing may occur at a location in between the sensors through one or more cylindrical tubes.

The sensors may be located closer to the ends of the inner manifold housing. One part of the sensors that detects an input manifold pressure may be located within the pressure chamber coupled to the intake manifold, and another part of the sensors may either sense a pressure at another location in the internal combustion engine or a reference pressure or vacuum through a reference chamber.

Taken together, by utilizing a MAP sensing element and a DP sensing element in a combination sensor as described above, undesired effects of input manifold filling may be reduced and more accurate EGR mass may be estimated. As a result, more accurate air mass may be determined and consequently, improved air/fuel ratio control and fuel delivery may be achieved. Additionally, by packaging the MAP and DP sensing elements into one combination sensor, a stand-alone DP sensor that may be otherwise required, may be eliminated. Consequently, electrical connectors and sensor mounting mechanisms for the stand-alone DP sensor may be eliminated resulting in cost savings.

Figure 4B:
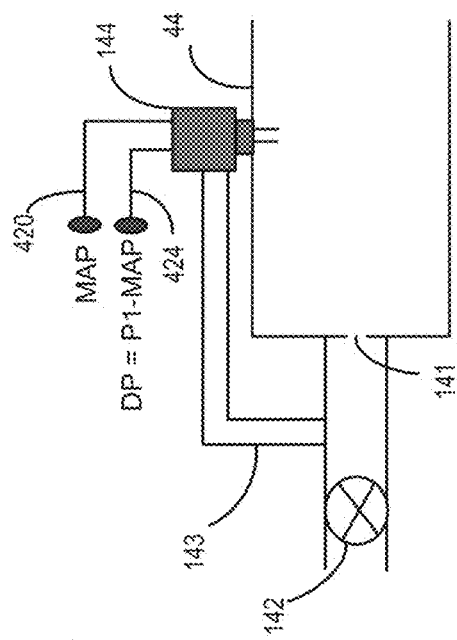
FIG. 4B shows a schematic diagram illustrating position of a combination sensor.

Turning to FIG. 4, a functional schematic of the combination sensor described in FIGS. 2-3 is shown at 4A and additional details of the sensor position are shown in FIG. 4B.

Figure 4A:
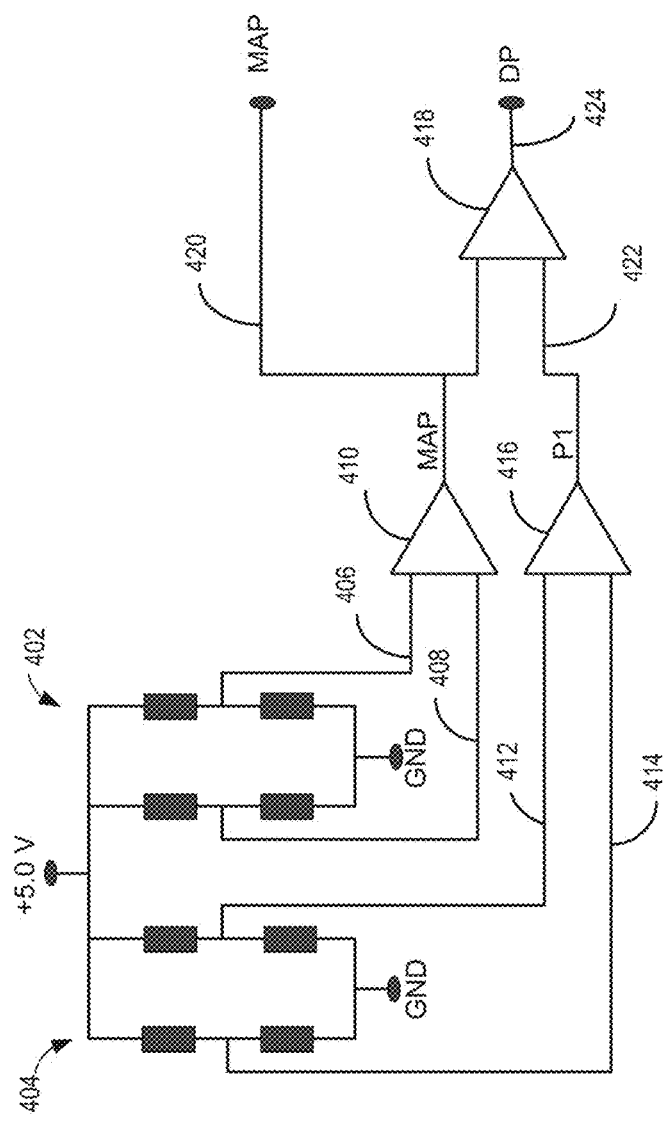
FIG. 4A shows a functional schematic of a combination sensor.

At FIG. 4A, MAP sensing element 402 and DP sensing element 404 connected to power supply of 5.0V and ground, are shown. MAP sensing element 402 detects a manifold pressure through a common pressure chamber as described at FIG. 2. Manifold pressure signal 406 generated by detection of the manifold pressure, and reference signal 408 may be sent from the MAP sensing element to an operational amplifier 410. The amplifier 410 may amplify a difference between the manifold pressure signal and the reference signal to generate a manifold absolute pressure (MAP) signal 420

A differential pressure across an EGR flow control orifice may be detected by the DP sensing element. Pressure signal 412 indicating a pressure upstream of the flow control orifice may be generated by the DP sensing element 404. Pressure signal 412 and reference signal 414 may be sent to an input of an operational amplifier 416, which may amplify a difference between the two input signals and may generate an upstream pressure signal P1 422.

As described at FIG. 2, the MAP sensing element and the DP sensing element may share a common pressure chamber and may detect an input manifold pressure through the common pressure chamber. Therefore, MAP signal 420 generated by the MAP sensing element and upstream pressure signal P1 422 generated by the DP sensing element at the respective amplifiers 410 and 416, may be used as inputs to another operational amplifier 418, where a difference between P1 and MAP signals may be amplified to generate differential pressure (DP) signal 424. Differential pressure thus obtained may represent a differential pressure across the EGR flow control orifice. As shown at FIG. 4B, the EGR flow control orifice may be located such that a pressure downstream of the flow control orifice may be the manifold pressure. Therefore, a pressure difference between the MAP and P1 may indicate a differential pressure across the EGR flow control orifice.

In one example, as shown at FIG. 4B, the combination sensor 144 may be located at the intake manifold 44, and the upstream pressure signal P1 may be detected through a connector 143 connecting the combination sensor to the upstream of the orifice.

In this way, the combination sensor may be used to generate MAP and DP signals, which may be used to determine EGR mass and flow. The MAP and DP signals may communicate with the PCM controller to determine EGR mass, and consequently, air mass and air/fuel ratio. Further, by determining the EGR mass through a single combination sensor, errors in EGR mass estimation due to manifold filling effects, especially during transient conditions, may be reduced. As a result, improved air/fuel ratio control may be obtained.

Figure 5:
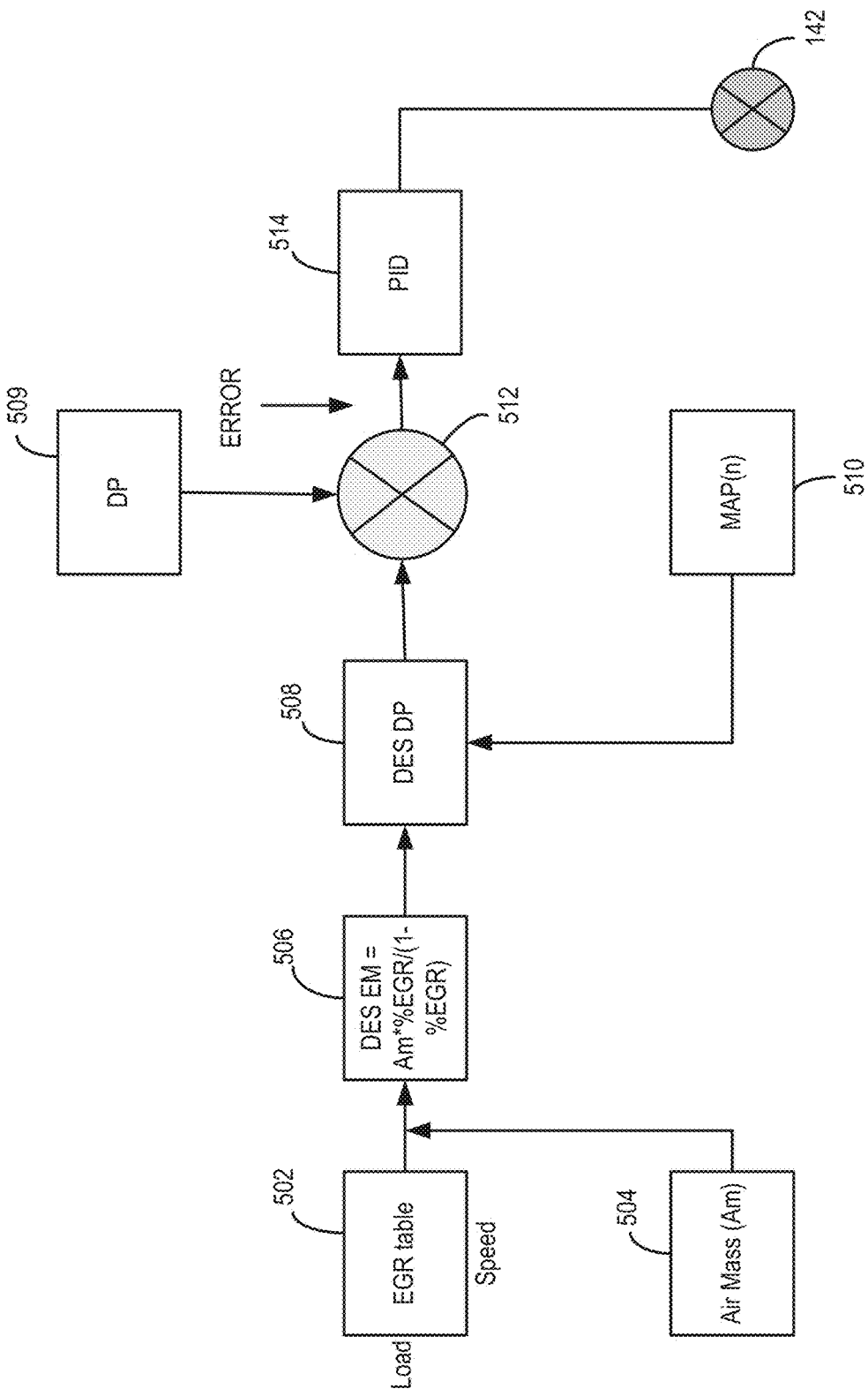
FIG. 5 shows a block diagram illustrating pressure feedback control of exhaust gas recirculation.

Turning to FIG. 5, a pressure feedback mechanism to control EGR flow by controlling the EGR valve through a PID controller is shown, which may be stored in memory of controller 12.

At 502, the controller determines a desired EGR percentage of fresh airflow (% EGR) based on engine speed and load. Then, based on the current air mass (as determined from MAP and speed density calculations, or a mass airflow sensor), at 506, the controller determines a desired EGR mass (DES EM).

Next, at 508, desired differential pressure (DES DP) may be determined based on desired EGR mass and the measured MAP from block 510. Block 510 may contain calculated MAP (calculated as described at FIG. 4) based on pressures detected by a combination sensor located at the intake manifold. Next, at 512, an error signal ERROR may be calculated based on desired DP, and measured DP 509 from the combination sensor. A PID controller, shown at block 514 may then determine an actuation signal based on calculated ERROR signal. The actuation signal may be used to adjust EGR flow by controlling the EGR valve 142 through the PID controller.

In this way, EGR flow may be adjusted by a pressure feedback mechanism controlling the EGR flow through the EGR valve based on an error calculated between desired flow and estimated flow.

Figure 6:
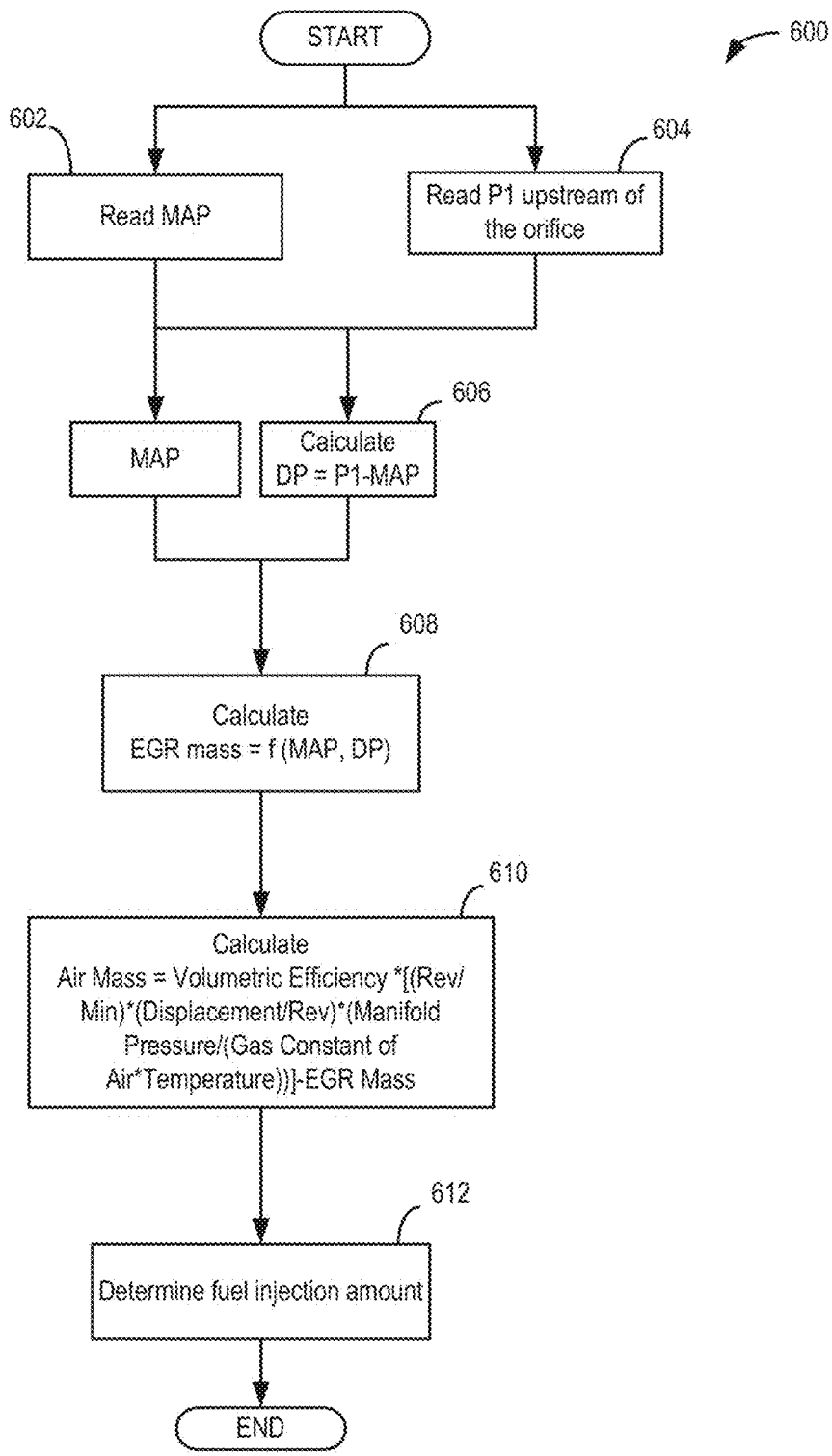
FIG. 6 shows a flow chart illustrating a method for estimating air mass.

Turning to FIG. 6, routine 600 for calculating air mass is described that works in coordination with the operation of FIG. 5. At 602, MAP signal from MAP sensing element of combination sensor may be read by the controller 12. Concurrently, P1 signal indicating pressure upstream of EGR flow control orifice may be read by the controller 12 from the DP sensing element of combination sensor. Based on a difference between P1 and MAP, differential pressure (DP) across the EGR flow control orifice may be determined at 606.

At 608, EGR mass may be calculated as a function of MAP and DP, for example based on a square root of the product. Based on the determined EGR mass, air mass may be calculated at 610 from the speed density equation, where:

$$\text{Air Mass} = \text{Volumetric Efficiency} * \left[\left(\frac{Rev}{Min}\right) * \left(\frac{Displacement}{Rev}\right) * \left(\frac{\text{Manifold Pressure}}{\text{Gas Constant of Air} * \text{Temperature}}\right)\right] - EGR \text{ Mass}$$

Next, at 612, a fuel injection amount may be determined based on the calculated air mass. In this way, air mass may be calculated based on EGR mass.

Transient conditions may occur, for example, due to rapid changes in throttle position or abrupt changes in the actual EGR demand. As a result, manifold filling effects may contribute to errors in EGR mass calculation if the differential pressure is sensed using a downstream pressure that lags actual manifold pressure used for air estimation. In engine control systems that employ speed density air estimation fueling strategy and utilize EGR, air mass may be estimated based on EGR mass and engine operating conditions including engine speed (See, speed density equation above). As a result, errors in calculated EGR mass may result in errors in estimated air mass. Therefore, reducing errors in EGR mass may reduce errors in estimated air mass, which may lead to improved air-fuel ratio control.

By utilizing a combination sensor that comprises of a MAP sensor and a DP sensor sharing a common pressure chamber in fluid communication with the input manifold, manifold pressure may be detected by the MAP sensing element and the DP sensing element simultaneously. As a result, any change in MAP may cause a simultaneous change in DP. In this way, by reducing a lag between the MAP and the DP signals, errors in EGR mass estimation due to input manifold filling during transient conditions may be reduced. By reducing EGR mass estimation errors, more accurate air mass may be determined, and consequently, errors in fuel delivery may be reduced leading to improved fuel economy.

Note that while some of the above examples show an EGR valve with a measuring orifice, an alternative approach may eliminate the orifice and utilize a differential pressure across the EGR valve. Such an approach may provide compensation of the orifice flow measurement based on the differential pressure and downstream (manifold) pressure based on valve opening area (e.g., based on valve position feedback). For example, the EGR flow may be mapped as a function of valve position, speed, load, MAP, and differential pressure. In this approach, the differential pressure port of the sensor, through connection 143, may lead to upstream of the EGR valve in the EGR passage. In this way, the differential pressure would be the differential pressure across the EGR valve.

It will be appreciated that the configurations disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an intake manifold;
an exhaust gas recirculation passage coupled to the intake manifold with an exhaust gas recirculation valve;
a sensor housing coupled directly to the intake manifold, with an absolute pressure sensing element and a differential pressure sensing element sharing a connection to the intake manifold, the absolute and differential pressure sensing elements each mounted on a common substrate within the housing; and
an orifice positioned downstream of the exhaust gas recirculation valve, the differential pressure sensing element including a downstream sensing element and an upstream sensing element, the upstream sensing element coupled to an upstream area of the orifice through a separate connection, the shared connection including an internal manifold positioned on the common substrate within the sensor housing, the internal manifold coupling the absolute pressure sensing element and the downstream differential pressure sensing element and the internal manifold including at least one port communicating with an interior of the intake manifold.

2. The system of claim 1, wherein the separate connection is on an opposite side of the sensor housing as the shared connection; wherein the internal manifold comprises a first end and a second end; and wherein the internal manifold is coupled to the intake manifold via one or more connectors positioned offset from a center of the internal manifold between the first and the second ends, closer to the absolute pressure sensing element than the differential pressure sensing element.

3. The system of claim 1, wherein the sensor housing is comprised of plastic, the intake manifold also comprised of plastic, the housing mounted to the intake manifold via a sealed port and an external fastener.

4. The system of claim 1, further comprising a controller with computer readable instructions for:

determining an exhaust gas recirculation amount based on outputs of the absolute pressure and the differential pressure sensing elements; and
determining an air flow based on the output of the absolute pressure sensing element and the exhaust gas recirculation amount.

5. The system of claim 1, wherein the absolute pressure sensing element and the differential pressure sensing element share a common pressure chamber, the common pressure chamber coupled to the intake manifold on a first side of the common substrate within the sensor housing.

6. The system of claim 1, wherein the differential pressure sensing element is coupled to an upstream area of the exhaust gas recirculation valve through a separate connection.

7. A system, comprising:
an intake manifold;
a sensor housing coupled to the intake manifold and enclosing: an inner manifold communicating with the intake manifold and first and second separate pressure sensing elements; and a port coupling the second sensing element with an exhaust gas recirculation (EGR) system via a passage; and
a controller including instructions for controlling an EGR valve to adjust EGR flow based on output of the first and second sensing elements;
wherein each of the first and second sensing elements is positioned on a common board within the sensor housing, the sensor housing being a unitary housing mounted directly to the intake manifold,
wherein the port is positioned on an opposite side of the second sensing element from the inner manifold,
wherein the second sensing element is a differential pressure sensing element and the first sensing element is an absolute pressure sensing element, and
wherein the inner manifold is U-shaped and mounted onto a backside panel, which is mounted to the common board.

8. The system of claim 7, wherein the port couples the second sensing element with the EGR system via the passage upstream of an orifice, the orifice positioned downstream of the EGR valve.

9. The system of claim 8, wherein the inner manifold communicates with the intake manifold via a connection positioned between the first and second sensing elements, closer to the first sensing element than the second sensing element.

10. The system of claim 7, wherein the inner manifold is curved between the first and second sensing element, the curve bending toward the intake manifold from the first and second sensing elements.

11. The system of claim 10, wherein a cross-section of the inner manifold is uniform through the curve; wherein an inner manifold housing comprises a first end and a second end; wherein each of the first and second ends are curved and have a convex shape; and wherein the first and the second sensing elements are positioned towards each of the first and second ends.

12. The system of claim 10, wherein the first and second sensing elements are located at opposite ends of the curve from one another; and wherein the first and the second sensing elements are positioned at a same level with respect to the intake manifold.

13. A system comprising:
an intake manifold having a sensor housing mounted directly thereon, the sensor housing including an internal manifold communicating with an interior of the intake manifold and a first differential pressure sensing element and a second absolute pressure sensing element;

a connection between only the differential sensing element and an exhaust gas recirculation system upstream of a measuring orifice; and a controller with non-transitory instructions stored in memory, including instructions for adjusting an exhaust gas recirculation valve responsive to outputs of each of the first and second pressure sensing elements, wherein the first differential pressure and the second absolute pressure sensing elements are positioned on a board within the sensor housing, wherein the controller further includes instructions for adjusting a fuel injection amount responsive to the first and second pressure sensing elements, wherein the inner manifold is coupled on a first side of the board, and the connection is coupled on a second, opposite side of the board, and wherein the inner manifold is curved with a first side of the curve having a concave surface and an opposite side of the curve having a corresponding convex surface; wherein the inner manifold has two curved ends, each curved end having a convex surface and turned towards a top side of the board; and wherein the top side of the board is opposite to a bottom side positioned closer to the intake manifold than the top side.

* * * * *